United States Patent
Jiang et al.

(10) Patent No.: US 11,367,044 B2
(45) Date of Patent: Jun. 21, 2022

(54) METHOD AND APPARATUS FOR OUTPUTTING STORAGE POSITION INFORMATION

(71) Applicant: Beijing Jingdong Zhenshi Information Technology Co., Ltd., Beijing (CN)

(72) Inventors: Shimiao Jiang, Beijing (CN); Yingguang Zhao, Beijing (CN); Hailong Wu, Beijing (CN); Xu Liu, Beijing (CN)

(73) Assignee: Beijing Jingdong Zhenshi Information Technology Co., Ltd., Beijing (CN)

(*) Notice: Subject to any disclaimer, the term of this patent is extended or adjusted under 35 U.S.C. 154(b) by 0 days.

(21) Appl. No.: 16/756,865

(22) PCT Filed: Apr. 4, 2018

(86) PCT No.: PCT/CN2018/081957
§ 371 (c)(1),
(2) Date: Apr. 17, 2020

(87) PCT Pub. No.: WO2019/100637
PCT Pub. Date: May 31, 2019

(65) Prior Publication Data
US 2021/0150460 A1    May 20, 2021

(30) Foreign Application Priority Data
Nov. 27, 2017 (CN) .......................... 201711205350.1

(51) Int. Cl.
*G06Q 10/08* (2012.01)
*G06N 20/00* (2019.01)
*G06Q 10/06* (2012.01)

(52) U.S. Cl.
CPC ........... *G06Q 10/087* (2013.01); *G06N 20/00* (2019.01); *G06Q 10/0639* (2013.01); *G06Q 10/06311* (2013.01)

(58) Field of Classification Search
CPC ....................... G06Q 10/087; G06Q 10/06311
See application file for complete search history.

(56) References Cited

U.S. PATENT DOCUMENTS

| | | | |
|---|---|---|---|
| 2010/0138037 A1 | 6/2010 | Adelberg et al. | |
| 2010/0138281 A1 | 6/2010 | Zhang et al. | |

FOREIGN PATENT DOCUMENTS

| | | |
|---|---|---|
| CN | 204355617 U | 5/2015 |
| CN | 106966100 A | 7/2017 |

(Continued)

OTHER PUBLICATIONS

International Search Report for PCT/CN2018/081957, dated Aug. 13, 2018, 2 pages.

(Continued)

*Primary Examiner* — A. Hunter Wilder
(74) *Attorney, Agent, or Firm* — Blank Rome LLP

(57) ABSTRACT

In the method according to embodiments, a characteristic vector of a preset dimension is generated based on attribute information of the to-be-shelved product in each attribute of a preset attribute set, and the generated characteristic vector is imported into a pre-trained current-period outbound quantity prediction model to obtain a predicted current-period outbound quantity of the to-be-shelved product; a shelving cost of the shelving task is determined based on a current inventory of the to-be-shelved product in the target warehouse, the to-be-shelved number, a volume of the to-be-shelved product, and the predicted current-period outbound quantity of the to-be-shelved product; a central storage position of the shelving task is determined based on the shelving cost of the shelving task, a predetermined product (Continued)

shelving cost table and a predetermined storage position shelving path length table; and a recommended storage position information set corresponding to the shelving task is generated and outputted.

17 Claims, 5 Drawing Sheets

(56) References Cited

FOREIGN PATENT DOCUMENTS

| | | |
|---|---|---|
| CN | 106980955 A | 7/2017 |
| CN | 107103446 A | 8/2017 |
| CN | 107122939 A | 9/2017 |
| CN | 107292428 A | 10/2017 |
| CN | 107358384 A | 11/2017 |

OTHER PUBLICATIONS

CA First Examination Report for CN Application No. 202017016919, dated Jul. 1, 2021, 5 pgs.

"Robotics in Logistics—A DPDHL Perspective on Implications and Use Cases for the Logistics Industry", DHL Customer Solutions & Innovation, dated Mar. 2016, 37 pgs.

METHOD AND APPARATUS FOR OUTPUTTING STORAGE POSITION INFORMATION

CROSS-REFERENCE TO RELATED APPLICATIONS

This application is a national stage of International Application No. PCT/CN2018/081957, filed on Apr. 4, 2018, which claims the priority of Chinese Patent Application No. 201711205350.1, titled "Method and Apparatus for Outputting Storage Position Information," filed on Nov. 27, 2017. Both of the aforementioned application are incorporated herein by reference in their entireties.

TECHNICAL FIELD

Embodiments of the present disclosure relate to the field of computer technologies, in particular to the field of logistics technologies, and more specifically to a method and apparatus for outputting storage position information.

BACKGROUND

At present, in the field of warehousing, there are mainly three technical solutions for storing an large article: classified storage, random storage, and associative storage layout. Classified storage is to place articles of the same category in the same warehouse according to product attributes. Classified storage is convenient for locating product locations, and is helpful for arranging storage environments according to the product attributes. Random storage directly places a newly-arrived article to the nearest or random available shelf. Associative storage layout is to place products that are often delivered simultaneously in close positions, the stronger the association is, the closer the positions are.

SUMMARY

Embodiments of the present disclosure propose a method and apparatus for outputting storage position information.

In a first aspect, the embodiments of the present disclosure provide a method for outputting storage position information. The method includes: receiving a shelving task for shelving a to-be-shelved number of a to-be-shelved product to a target warehouse; generating a characteristic vector of a preset dimension based on attribute information of the to-be-shelved product in each attribute of a preset attribute set, and importing the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity; determining a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product; determining a central storage position of the shelving task based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being used to represent a minimum value in shortest paths between warehouse doors of the warehouse and a storage position indicated by the storage position identifier; and generating and outputting a recommended storage position information set corresponding to the shelving task based on storage position information of the central storage position and storage position information of an available storage position in the target warehouse.

In some embodiments, the preset attribute set includes at least one of: a category, a brand, a current month, an outbound quantity in a last week, an outbound quantity in last two weeks, a preset maximum inventory, an inventory at a preset time of a last period, or a current inventory.

In some embodiments, the current-period outbound quantity prediction model is obtained through following training steps: acquiring an initial current-period outbound quantity prediction model and a predetermined sample data set, where each piece of sample data in the sample data set includes an attribute information set of a product under attributes in the preset attribute set and a historical current-period outbound quantity corresponding to the product; generating, for each piece of sample data in the sample data set, a characteristic vector of the preset dimension corresponding to the attribute information set in the sample data; training, using a machine learning method, the initial current-period outbound quantity prediction model using the characteristic vector of the preset dimension corresponding to the attribute information set in each piece of sample data in the sample data set as input data and using the historical current-period outbound quantity in the sample data as corresponding output data; and determining the trained initial current-period outbound quantity prediction model as the pre-trained current-period outbound quantity prediction model.

In some embodiments, the determining a shelving cost of the shelving task based on a current inventory of the to-be-shelved product in the target warehouse, the to-be-shelved number, a volume of the to-be-shelved product, and the predicted current-period outbound quantity of the to-be-shelved product, includes: calculating a sum of the current inventory of the to-be-shelved product in the target warehouse and the to-be-shelved number; calculating a product of the calculated sum and the volume of the to-be-shelved product; and determining a ratio of the calculated product to the predicted current-period outbound quantity of the to-be-shelved product as the shelving cost of the shelving task.

In some embodiments, the storage position shelving path length table is sorted in an ascending order of storage position shelving path lengths; and the determining a central storage position of the shelving task based on the shelving cost of the shelving task, a predetermined product shelving cost table and a predetermined storage position shelving path length table, includes: determining a sum of expected occupancy storage position numbers of low shelving cost products as a sum of first storage position numbers, where the low shelving cost products are products indicated by product identifiers having product shelving costs less than the shelving cost of the shelving task in the product shelving cost table; determining a number obtained by rounding down a product of an expected occupancy storage position number of the to-be-shelved product and a preset ratio as a first number, where the preset ratio is a value greater than or equal to 0 and smaller than or equal to 1; determining a sum of the sum of the first storage position numbers and the first number as a central storage position location corresponding to the shelving task; and determining a storage position indicated by a storage position identifier arranged in a location of the central storage position of the storage position shelving path length table as the central storage position of the shelving task.

In some embodiments, the predetermined product shelving cost table is obtained through following steps: for each product identifier in a product identifier set corresponding to the target warehouse, performing following shelving cost determination operations: generating a characteristic vector of a preset dimension based on attribute information of a product indicated by the product identifier in each attribute of the preset attribute set, and importing the generated characteristic vector into the current-period outbound quantity prediction model to obtain a predicted current-period outbound quantity of the product indicated by the product identifier; determining a shelving cost of the product indicated by the product identifier based on a current inventory of the product indicated by the product identifier in the target warehouse, a volume of the product, and the predicted current-period outbound quantity of the product indicated by the product identifier, where the shelving cost of the product indicated by the product identifier is negatively related to the predicted current-period outbound quantity of the product indicated by the product identifier and is positively related to both the current inventory of the product indicated by the product identifier in the target warehouse, and the volume of the product; and generating the product shelving cost table based on each product identifier in the product identifier set corresponding to the target warehouse and the shelving cost of the product indicated by the product identifier.

In some embodiments, the predetermined storage position shelving path length table is obtained through following steps: acquiring a directed graph corresponding to the target warehouse, where vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge, the storage position or the warehouse door corresponding to the starting point of the directed edge being adjacent to the storage position or the warehouse door corresponding to the starting point; for each storage position in the target warehouse, performing following storage position shelving path length determination operations: for each warehouse door of the warehouse doors of the target warehouse, determining a shortest path length from the warehouse door to the storage position according to the directed graph; and determining a minimum value in shortest path lengths from the warehouse doors to the storage position of the target warehouse as a storage position shelving path length of the storage position; and generating the storage position shelving path length table, based on a storage position identifier of each storage position in the target warehouse and a storage position shelving path length of the storage position.

In some embodiments, the generating and outputting a recommended storage position information set corresponding to the shelving task based on the central storage position and an available storage position in the target warehouse, includes: determining a number obtained by rounding up a ratio of the to-be-shelved number to a number of products accommodated in a unit of storage position of the to-be-shelved product in the target warehouse as a sub-task number; determining a number obtained by rounding up a ratio of the to-be-shelved number to a number of products accommodated in a unit of storage position of the to-be-shelved product in the target warehouse as a sub-task number; establishing an empty recommended storage position information set; for each sub-task of the sub-task number of sub-tasks, performing following recommended storage position determination operations: searching for an available storage position having a shortest path to the central storage position in storage positions of the target warehouse; adding storage position information of the found available storage position to the recommended storage position information set; and marking the found available storage position as a non-available storage position; and outputting the recommended storage position information set.

In a second aspect, the embodiments of the present disclosure provide an apparatus for outputting storage position information. The apparatus includes: a shelving task receiving unit, configured to receive a shelving task for shelving a to-be-shelved number of a to-be-shelved product to a target warehouse; a current-period outbound quantity determination unit, configured to generate a characteristic vector of a preset dimension based on attribute information of the to-be-shelved product in each attribute of a preset attribute set, and import the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity; a shelving cost determination unit, configured to determine a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product; a central storage position determination unit, configured to determine a central storage position of the shelving task, based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being configured to represent a minimum value in shortest paths between warehouse doors of the warehouse and a storage position indicated by the storage position identifier; and a generating and outputting unit, configured to generate and output a recommended storage position information set corresponding to the shelving task based on storage position information of the central storage position and storage position information of an available storage position in the target warehouse.

In some embodiments, the preset attribute set includes at least one of: a category, a brand, a current month, an outbound quantity in a last week, an outbound quantity in last two weeks, a preset maximum inventory, an inventory at a preset time of a last period, or a current inventory.

In some embodiments, the current-period outbound quantity prediction model is obtained through following training steps: acquiring an initial current-period outbound quantity prediction model and a predetermined sample data set, where each piece of sample data in the sample data set includes an attribute information set of a product under attributes in the preset attribute set and a historical current-period outbound quantity corresponding to the product; generating, for each piece of sample data in the sample data set, a characteristic vector of the preset dimension corresponding to the attribute information set in the sample data; training, using a machine learning method, the initial current-period outbound quantity prediction model using the characteristic vector of the preset dimension corresponding to the attribute information set in each piece of sample data in the sample data set as input data and using the historical current-period outbound quantity in the sample data as corresponding output data; and determining the trained initial current-period outbound quantity prediction model as the pre-trained current-period outbound quantity prediction model.

In some embodiments, the shelving cost determination unit includes a first calculation module configured to calculate a sum of the current inventory of the to-be-shelved product in the target warehouse and the to-be-shelved number; a second calculation module configured to calculate a product of the calculated sum and the volume of the to-be-shelved product; and a first determination module configured to determine a ratio of the calculated product to the predicted current-period outbound quantity of the to-be-shelved product as the shelving cost of the shelving task.

In some embodiments, the storage position shelving path length table is sorted in an ascending order of storage position shelving path lengths; and the central storage position determination unit includes a second determination module configured to determine a sum of expected occupancy storage position numbers of low shelving cost products as a sum of first storage position numbers, where the low shelving cost products are products indicated by product identifiers having product shelving costs less than the shelving cost of the shelving task in the product shelving cost table; a third determination module configured to determine a number obtained by rounding down a product of an expected occupancy storage position number of the to-be-shelved product and a preset ratio as a first number, where the preset ratio is a value greater than or equal to 0 and smaller than or equal to 1; a fourth determination module configured to determine a sum of the sum of the first storage position numbers and the first number as a central storage position location corresponding to the shelving task; and a fifth determination module configured to determine a storage position indicated by a storage position identifier arranged in a location of the central storage position of the storage position shelving path length table as the central storage position of the shelving task.

In some embodiments, the predetermined product shelving cost table is obtained through following steps: for each product identifier in a product identifier set corresponding to the target warehouse, performing following shelving cost determination operations: generating a characteristic vector of a preset dimension based on attribute information of a product indicated by the product identifier in each attribute of the preset attribute set, and importing the generated characteristic vector into the current-period outbound quantity prediction model to obtain a predicted current-period outbound quantity of the product indicated by the product identifier; determining a shelving cost of the product indicated by the product identifier based on a current inventory of the product indicated by the product identifier in the target warehouse, a volume of the product, and the predicted current-period outbound quantity of the product indicated by the product identifier, where the shelving cost of the product indicated by the product identifier is negatively related to the predicted current-period outbound quantity of the product indicated by the product identifier and is positively related to both the current inventory of the product indicated by the product identifier in the target warehouse, and the volume of the product; and generating the product shelving cost table based on each product identifier in the product identifier set corresponding to the target warehouse and the shelving cost of the product indicated by the product identifier.

In some embodiments, the predetermined storage position shelving path length table is obtained through following steps: acquiring a directed graph corresponding to the target warehouse, where vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge, the storage position or the warehouse door corresponding to the starting point of the directed edge being adjacent to the storage position or the warehouse door corresponding to the starting point; for each storage position in the target warehouse, performing following storage position shelving path length determination operations: for each warehouse door of the warehouse doors of the target warehouse, determining a shortest path length from the warehouse door to the storage position according to the directed graph; and determining a minimum value in shortest path lengths from the warehouse doors to the storage position of the target warehouse as a storage position shelving path length of the storage position; and generating the storage position shelving path length table, based on a storage position identifier of each storage position in the target warehouse and a storage position shelving path length of the storage position.

In some embodiments, the generating and outputting unit includes a sixth determination module configured to determine a number obtained by rounding up a ratio of the to-be-shelved number to a number of products accommodated in a unit of storage position of the to-be-shelved product in the target warehouse as a sub-task number; a task splitting module configured to split the shelving task into the sub-task number of sub-tasks; an establishing module configured to establish an empty recommended storage position information set; a seventh determination module configured to for each sub-task of the sub-task number of sub-tasks, perform following recommended storage position determination operations: searching for an available storage position having a shortest path to the central storage position in storage positions of the target warehouse; adding storage position information of the found available storage position to the recommended storage position information set; and marking the found available storage position as a non-available storage position; and an output module configured to output the recommended storage position information set.

In a third aspect, the embodiments of the present disclosure further provide a server, including: one or more processors; a storage apparatus, for storing one or more programs; and the one or more programs, when executed by the one or more processors, cause the one or more processors to implement the method according to any implementation in the first aspect.

In a fourth aspect, the embodiments of the present disclosure provide a computer readable storage medium, storing a computer program thereon, the program, when executed by a processor, implements the method according to any implementation in the first aspect.

According to the method and apparatus for outputting storage position information provided by the embodiments of the present disclosure, a characteristic vector of a preset dimension is generated based on attribute information of the to-be-shelved product in each attribute of a preset attribute set, and the generated characteristic vector is imported into a pre-trained current-period outbound quantity prediction model to obtain a predicted current-period outbound quantity of the to-be-shelved product; then a shelving cost of the shelving task is determined based on a current inventory of the to-be-shelved product in the target warehouse, the to-be-shelved number, a volume of the to-be-shelved product, and the predicted current-period outbound quantity of the to-be-shelved product; then a central storage position of the shelving task is determined based on the shelving cost of the shelving task, a predetermined product shelving cost table and a predetermined storage position shelving path length table; and finally a recommended storage position information set corresponding to the shelving task is generated and outputted based on the central storage position and an available storage position in the target warehouse. Therefore, the central storage position of the shelving task generated by combining the shelving cost of the to-be-shelved product, the product shelving cost table and the storage position shelving path length table, is the optimal storage position for the to-be-shelved product. Using an available storage position around the central storage position as a recommended storage position may reduce the shelving cost of the shelving task. That is, effective storage position information output is realized.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
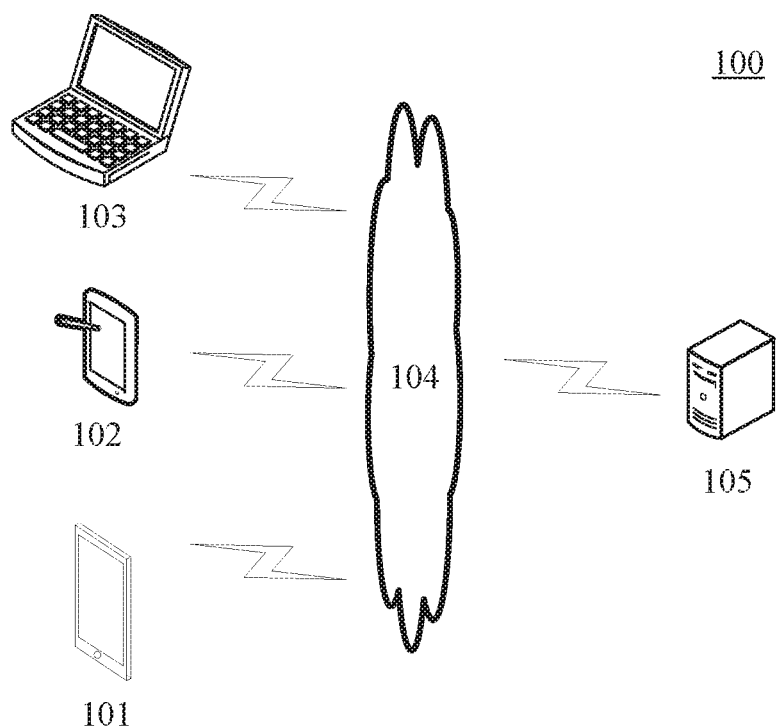
FIG. 1 is a diagram of an example system architecture in which the present disclosure may be implemented.

FIG. 1 illustrates an example system architecture 100 in which a method for outputting storage position information or an apparatus for outputting storage position information of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103, to receive or send messages and the like. Various client applications may be installed on the terminal devices 101, 102, 103, such as logistics applications, web browser applications, shopping applications, search applications, instant messaging tools, mailbox clients, social platform software, etc.

The terminal devices 101, 102, 103 may be various electronic devices having display screens, including but not limited to smart phones, tablet computers, laptop computers, and desktop computers.

The server 105 may be a server that provides various services, such as a background server that provides support for logistics applications displayed on the terminal devices 101, 102, and 103. The background server may perform analysis and other processing on received data such as a shelving task, and feed back a processing result (such as a recommended storage position information set) to the terminal devices.

It should be noted that the method for outputting storage position information provided by the embodiments of the present disclosure is generally performed by the server 105, accordingly, the apparatus for outputting storage position information is generally provided in the server 105.

It should be understood that the number of terminal devices, networks, and servers in FIG. 1 is merely illustrative. Depending on the implementation needs, there may be any number of terminal devices, networks, and servers.

Figure 2:
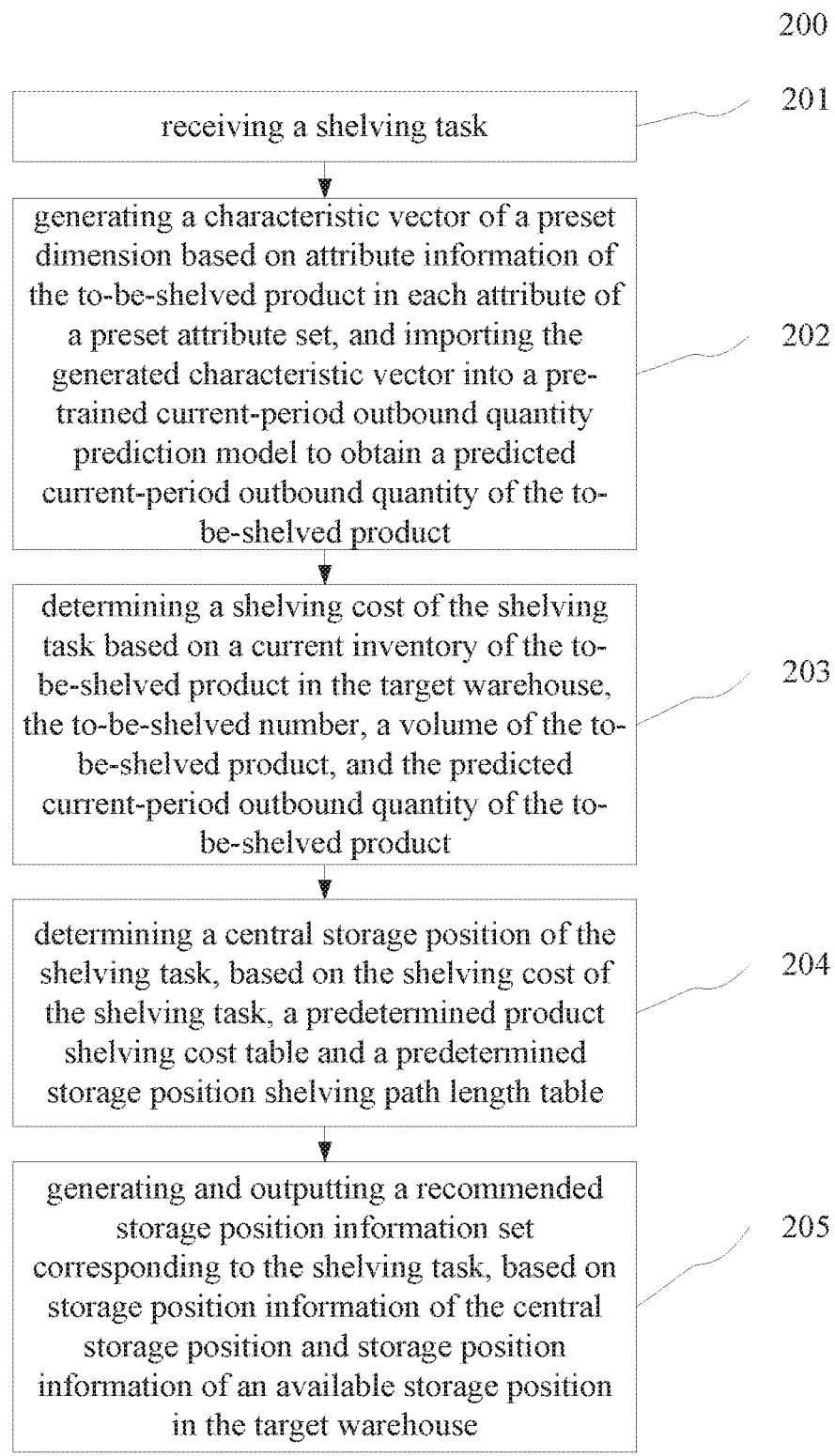
FIG. 2 is a flowchart of an embodiment of a method for outputting storage position information according to the present disclosure.

With further reference to FIG. 2, a flow 200 of an embodiment of a method for outputting storage position information according to the present disclosure is illustrated. The method for outputting storage position information includes the following steps:

Step 201, receiving a shelving task.

In the present embodiment, an electronic device (such as the server shown in FIG. 1) on which the method for outputting storage position information is run may receive the shelving task from other electronic devices (such as the terminal devices shown in FIG. 1) having a network connection with the above electronic device through a wired connection or a wireless connection. The shelving task is used to shelve a to-be-shelved number of a to-be-shelved product to a target warehouse. Here, the other electronic devices may be hand-held electronic devices of a working staff performing the shelving task, for example, personal digital assistants (PDA), tablet computers, smart phones, or the like. Of course, the other electronic devices may alternatively be robots performing shelving tasks.

Step 202, generating a characteristic vector of a preset dimension based on attribute information of the to-be-shelved product in each attribute of a preset attribute set, and importing the generated characteristic vector into a pre-trained current-period outbound quantity prediction model to obtain a predicted current-period outbound quantity of the to-be-shelved product.

In the present embodiment, the electronic device (such as the server shown in FIG. 1) may first acquire the attribute information of the to-be-shelved product in each attribute of the preset attribute set, then, generate the characteristic vector of the preset dimension based on the acquired attribute information, and import the generated characteristic vector of the preset dimension into the pre-trained current-period outbound quantity prediction model to obtain the predicted current-period outbound quantity of the to-be-shelved product. Here, the obtained predicted current-period outbound quantity of the to-be-shelved product may be used to indicate and predict an outbound quantity of the to-be-shelved product in the target warehouse within the current preset period (for example, the present day), and the predicted current-period outbound quantity of the to-be-shelved product may be a positive integer.

In the present embodiment, the attribute of a product may include an attribute of the product itself and an attribute accompanying the product. For example, the attribute of the product itself may include, but is not limited to: first-level category, second-level category, third-level category, brand, and model, and the accompanying attribute of the product may include, but is not limited to: the current month, an outbound quantity in the last week, an outbound quantity in the last two weeks, a preset maximum inventory, an inventory at the preset time of the last period (for example, yesterday at 8 pm), and the current inventory. Here, the outbound quantity in the last week, the outbound quantity in the last two weeks, the preset maximum inventory, the inventory at a preset time of the last period, and the current inventory of the to-be-shelved product are the outbound quantity in the last week, the outbound quantity in the last two weeks, the preset maximum inventory, the inventory at the preset time of the last period, and the current inventory of the to-be-shelved product in the target warehouse.

It should be noted that the current-period outbound quantity prediction model is configured to represent a corresponding relationship between the characteristic vector of the preset dimension and the current-period outbound quantity.

For example, the current-period outbound quantity prediction model may be a corresponding relationship table storing the corresponding relationships between characteristic vectors of multiple preset dimensions and the current-period outbound quantity, pre-established based on the statistics of a large number of characteristic vectors of preset dimensions and the current-period outbound quantity by those skilled in the art; or may alternatively be a calculation formula used to represent a calculation result of the current-period outbound quantity obtained by numerically calculating one or more values in characteristic vectors of preset dimensions, preset and stored to the electronic device based on the statistics of a large amount of data by those skilled in the art.

In some alternative implementations of the present embodiment, the current-period outbound quantity prediction model may be obtained through the following training steps:

First, an initial current-period outbound quantity prediction model and a predetermined sample data set may be acquired. Here, each piece of sample data in the sample data set includes a set of pieces of attribute information of a product under attributes in the preset attribute set and a historical current-period outbound quantity corresponding to the product. Here, the historical current-period outbound quantity of the product may be the outbound quantity of the product within a preset period (for example, one day) in the history of the target warehouse. For example, the preset attribute set here may include, but is not limited to: a product category, a brand, the current month, an outbound quantity in the last week, an outbound quantity in the last two weeks, a preset maximum inventory, an inventory at a preset time of the last period, and the current inventory.

It should be noted that the initial current-period outbound quantity prediction model may include, but is not limited to, gradient boosting decision tree (GDBT), neural network (NN), support vector machine (SVM), AdaBoost, random forest, and other machine learning models for supervised learning now known or to-be-developed in the future. Acquiring the initial current-period outbound quantity prediction model is to acquire the model type of the initial current-period outbound quantity prediction model and the initial values of model parameters.

Then, for each piece of sample data in the sample data set, a characteristic vector of the preset dimension corresponding to the attribute information set of the piece of the sample data may be generated. Here, various implementations may be used to generate the characteristic vector, which is not specifically limited in the present disclosure.

For example, let $C=\{c_i|1\leq i\leq p\}$ be the set of p third-level categories to which the products that can be stored in the target warehouse belong, $B=\{b_{ij}|1\leq i\leq p, 1\leq j\leq 10\}$ is brands with top 10 outbound quantity in category i counted using year as the dimension; m is the current month, and m is a positive integer between 1 and 12; for the product indicated by the product identifier k, the product category is $c_k$, the brand is $b_k$, the volume is $v_k$, the outbound quantity in the last week is $o_k^{(7)}$, the outbound quantity in the last two weeks is $o_k^{(14)}$, the inventory at a preset time of the last period is $s_k^{(1)}$, the current inventory is $s_k$, and the preset maximum inventory is $s_k^{max}$. Then, the characteristic vector of the preset dimension corresponding to the attribute information set in the piece of sample data corresponding to the product indicated by the product identifier k may be generated according to the following steps:

First, calculate the brand score $fb_k$, if $b_k \in \{b_{c_k j}|1\leq j\leq 10\}$, $fb_k$ is 1, otherwise $fb_k$ is 0;

Second, calculate a stocking ratio $sr_k$, $$sr_k = \frac{s_k^{(1)}}{s_k^{max}};$$

Third, construct the characteristic vector $\vec{v}_k = (c_k, fb_k, m, o_k^{(7)}, o_k^{(14)}, sr_k)$.

Here, the characteristic vector $\vec{v}_k$ is the generated characteristic vector of the preset dimension.

Then, a machine learning method may be used to use the characteristic vector of the preset dimension corresponding to the attribute information set in each piece of sample data in the sample data set as input data, and use the historical current-period outbound quantity in the sample data as corresponding output data, to train the initial current-period outbound quantity prediction model.

It should be noted that various methods for training a machine learning model suitable for supervised learning are well-known technologies that are widely studied and applied at present, and detailed description thereof will be omitted. It may be understood that, due to the different model types of the initial current-period outbound quantity prediction model, the corresponding model training methods may also be different.

At present, most of the model training processes may include: performing a calculation using the input data as current parameters of the model to obtain an output result, then calculating the difference between the obtained output result and the output data, and then according to a preset optimization goal, adjusting the current parameters of the model based on the calculated difference.

Alternatively, the training may be ended in advance when the preset optimization goal is achieved, thereby reducing training time. For example, the preset optimization goal may be that the difference between the output result and the output data is smaller than a preset difference threshold.

Finally, the trained initial current-period outbound quantity prediction model may be determined as the pre-trained current-period outbound quantity prediction model.

Step 203, determining a shelving cost of the shelving task based on a current inventory of the to-be-shelved product in the target warehouse, the to-be-shelved number, a volume of the to-be-shelved product, and the predicted current-period outbound quantity of the to-be-shelved product.

In the present embodiment, the electronic device on which the method for outputting storage position information is run may first acquire the current inventory of the to-be-shelved product in the target warehouse, and the volume of the to-be-shelved product.

Then, the electronic device may use various implementations, to determine the shelving cost of the shelving task based on the current inventory of the to-be-shelved product in the target warehouse, the to-be-shelved number, the volume of the to-be-shelved product, and the predicted current-period outbound quantity of the to-be-shelved product.

In the present embodiment, if the predicted current-period outbound quantity of the to-be-shelved product is large, it indicates that the to-be-shelved product may be delivered at the current period (for example, the present day). To this end, the to-be-shelved product needs to be shelved to a storage position close to a position having the shortest path length to the warehouse door of the target warehouse in order to perform an outbound operation at the current period. Moreover, with larger predicted current-period outbound quantity, the to-be-shelved product should be shelved to a storage position closer to the warehouse door of the target warehouse. That is, the predicted current-period outbound quantity of the to-be-shelved product is negatively related to the shortest path length between the storage position to which the product is shelved and the warehouse door.

In the present embodiment, in order to reduce the shelving cost, a to-be-shelved product involved in a shelving task with low shelving cost is normally shelved to the storage position close to a position having the shortest path length to the warehouse door of the target warehouse, and a to-be-shelved product involved in a shelving task with high shelving cost is shelved to the storage position far from the warehouse door of the target warehouse. That is, the shelving cost of the shelving task is positively related to the shortest path length between the storage position to which the product is shelved and the warehouse door.

In the present embodiment, the predicted current-period outbound quantity of the to-be-shelved product is negatively related to the shortest path length between the storage position to which the product is shelved and the warehouse door, and the shelving cost of the shelving task is positively related to the shortest path length between the storage position to which the product is shelved and the warehouse door. Therefore, the shelving cost of the shelving task is negatively related to the predicted current-period outbound quantity of the to-be-shelved product, that is, the larger the predicted current-period outbound quantity of the to-be-shelved product is, the lower the shelving cost of the shelving task is, and the smaller the predicted current-period outbound quantity of the to-be-shelved product is, the higher the shelving cost of the shelving task is.

In the present embodiment, the larger current inventory of the to-be-shelved product in the target warehouse indicates that more to-be-shelved product is increased in the target warehouse after the to-be-shelved product is shelved. In order to reduce the outbound cost, for a product with a larger number in the warehouse, the product should be shelved to a storage position having a farther shortest path length to the warehouse door. That is, the current inventory of the to-be-shelved product in the target warehouse is positively related to the shortest path length between the storage position to which the product is shelved and the warehouse door. From the above description, the shelving cost of the shelving task is positively related to the shortest path length between the storage position to which the product is shelved and the warehouse door. Therefore, the shelving cost of the shelving task should also be positively related to the current inventory of the to-be-shelved product in the target warehouse, that is, the larger the current inventory of the to-be-shelved product in the target warehouse is, the higher the shelving cost of the shelving task is, and the smaller the current inventory of the to-be-shelved product in the target warehouse is, the lower the shelving cost of the shelving task is.

In the present embodiment, the larger to-be-shelved number indicates that more number of the to-be-shelved product in the target warehouse is increased after the to-be-shelved product is shelved. In order to reduce the outbound cost, for a product with the larger number in the warehouse, the product should be shelved to a storage position having a farther shortest path length to the warehouse door. That is, the to-be-shelved number is positively related to the shortest path length between the storage position to which the product is shelved and the warehouse door. From the above description, the shelving cost of the shelving task is positively related to the shortest path length between the storage position to which the product is shelved and the warehouse door. Therefore, the shelving cost of the shelving task should also be positively related to the to-be-shelved number, that is, the larger the to-be-shelved number is, the higher the shelving cost of the shelving task is, and the smaller the to-be-shelved number is, the lower the shelving cost of the shelving task is.

In the present embodiment, the larger volume of the to-be-shelved product indicates that the to-be-shelved product occupies more space in the target warehouse after the to-be-shelved product is shelved. In order to reduce the outbound cost, for a product occupying more space in the warehouse, the product should be shelved to a storage position having a farther shortest path length to the warehouse door. That is, the volume of the to-be-shelved product is positively related to the shortest path length between the storage position to which the product is shelved and the warehouse door. From the above description, the shelving cost of the shelving task is positively related to the shortest path length between the storage position to which the product is shelved and the warehouse door. Therefore, the shelving cost of the shelving task should also be positively related to the volume of the to-be-shelved product, that is, the larger the volume of the to-be-shelved product is, the higher the shelving cost of the shelving task is, and the smaller the volume of the to-be-shelved product is, the lower the shelving cost of the shelving task is.

The present disclosure does not specifically limit the specific implementation of determining the shelving cost of the shelving task, as long as the shelving cost of the shelving task is negatively related to the predicted current-period outbound quantity of the to-be-shelved product and is positively related to the current inventory of the to-be-shelved product in the target warehouse, the to-be-shelved number and the volume of the to-be-shelved product.

In some alternative implementations of the present embodiment, the electronic device may calculate the shelving cost of the shelving task according to the following formula:

$$cost_i = \frac{(sto_i + on_i)vol_i}{out_i} \quad \text{(formula 1)}$$

here:

i is the product identifier of a to-be-shelved product;

$out_i$ is the predicted current-period outbound quantity of the to-be-shelved product i;

$sto_i$ is the current inventory of the to-be-shelved product i in the target warehouse;

$on_i$ is the to-be-shelved number;

$vol_i$ is the volume of the to-be-shelved product i;

$cos t_i$ is the calculated shelving cost of the shelving task.

From the above formula, it can be seen that the shelving cost of the shelving task is negatively related to the predicted current-period outbound quantity of the to-be-shelved product and is positively related to the current inventory of the to-be-shelved product in the target warehouse, the to-be-shelved number and the volume of the to-be-shelved product.

Step 204, determining a central storage position of the shelving task, based on the shelving cost of the shelving task, a predetermined product shelving cost table and a predetermined storage position shelving path length table.

In the present embodiment, first, the electronic device may acquire the predetermined product shelving cost table and the predetermined storage position shelving path length table.

In the present embodiment, the product shelving cost table is configured to represent a corresponding relationship between a product identifier and a product shelving cost. That is, the product shelving cost table stores the corresponding relationships between product identifiers of various products that stored in the target warehouse or can be stored in the target warehouse, and the shelving costs of the products indicated by the product identifiers in the target warehouse. For example, the target warehouse may be a large-product warehouse for storing products of large volume, large products may be stored in the target warehouse, such as washing machines, televisions, refrigerators, air conditioners, air purifiers, range hoods, or gas stoves, and small products cannot be stored in the target warehouse, such as cosmetics, clothes, shoes and hats, daily necessities, or office supplies.

In practice, a corresponding product identifier set may be set for the target warehouse, and the product indicated by each product identifier in the set product identifier set may be stored in the target warehouse.

For example, the product shelving cost table may be pre-established by those skilled in the art based on each product identifier in the product identifier set corresponding to the target warehouse, and based on statistics of a historical inbound record and historical outbound record of the product indicated by the product identifier in the target warehouse, and may be a corresponding relationship table storing the corresponding relationships between product identifiers and product shelving costs.

In some alternative implementations of the present embodiment, the predetermined product shelving cost table may be obtained through the following steps:

First, for each product identifier in the product identifier set corresponding to the target warehouse, the following shelving cost determination operations may be performed:

first, generating a characteristic vector of the preset dimension based on attribute information of a product indicated by the product identifier in each attribute in the preset attribute set;

second, importing the generated characteristic vector into the current-period outbound quantity prediction model to obtain a predicted current-period outbound quantity of the product indicated by the product identifier; and third, determining a shelving cost of the product indicated by the product identifier in the target warehouse, based on a current inventory of the product indicated by the product identifier in the target warehouse, a volume of the product, and the calculated predicted current-period outbound quantity of the product indicated by the product identifier in the target warehouse, where the shelving cost of the product indicated by the product identifier in the target warehouse is negatively related to the predicted current-period outbound quantity of the product indicated by the product identifier in the target warehouse and is positively related to both the current inventory of the product indicated by the product identifier in the target warehouse, and the volume of the product.

Alternatively, the shelving cost of the product indicated by the product identifier in the target warehouse may be calculated according to the following formula:

$$cost_j = \frac{sto_j \times vol_j}{out_j} \quad \text{(formula 2)}$$

here, j is the product identifier;

$out_j$ is the predicted current-period outbound quantity of the product j;

$sto_j$ is the current inventory of the product j in the target warehouse;

$vol_j$ is the volume of the product j;

$cos t_j$ is the calculated shelving cost of the product j in the target warehouse.

Then, the product shelving cost table may be generated based on each product identifier in the product identifier set corresponding to the target warehouse and the shelving cost of the product indicated by the product identifier.

In the present embodiment, the predetermined storage position shelving path length table is configured to represent a corresponding relationship between a storage position identifier of a storage position and a storage position shelving path length of the storage position in the target warehouse, where the storage position shelving path length of the storage position in the target warehouse is used to represent a minimum value of the shortest path lengths between the warehouse doors of the target warehouse and the storage position of the target warehouse. For example, the storage position shelving path length table may be a corresponding relationship table being pre-established by those skilled in the art based on electronic map data corresponding to the target warehouse, and storing the corresponding relationships between storage position identifiers and storage position shelving path lengths.

In some alternative implementations of the present embodiment, the predetermined storage position shelving path length table may be obtained through the following steps:

First, a directed graph corresponding to the target warehouse may be acquired.

Here, vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge and being adjacent to the storage position or the warehouse door corresponding to the starting point;

Then, for each storage position in the target warehouse, the following storage position shelving path length determination operations may be performed:

First, for each warehouse door of the warehouse doors of the target warehouse, the shortest path length from the warehouse door to the storage position is determined according to the acquired directed graph corresponding to the target warehouse.

Here, various algorithms may be used to determine the shortest path between two vertices in the directed graph, which is not specifically limited in the present disclosure. For example, Dijkstra's Algorithm, A-star Algorithm, etc.

Second, the minimum value in the shortest path lengths from the warehouse doors to the storage position of the target warehouse is determined as a storage position shelving path length of the storage position.

Finally, the storage position shelving path length table may be generated based on a storage position identifier of each storage position in the target warehouse and a storage position shelving path length of the storage position.

Here, the storage position shelving path length table may be directly formed by the storage position identifier of each storage position in the target warehouse and the storage position shelving path length of the storage position.

Here, the storage position shelving path length of each storage position in the target warehouse may alternatively be first normalized, and then the storage position identifier of each storage position in the target warehouse and the normalized storage position shelving path length of the storage position may be used to form the storage position shelving path length table. The present disclosure does not specifically limit the normalization method. For example, the storage position shelving path length of the storage position may be normalized according to the following formula:

$$W = \left\{ w_k = \frac{d_k - d_{min}}{d_{max} - d_{min}} \middle| d_k \in D, d_{min} = \min\{D\}, d_{max} = \max\{D\} \right\} \quad \text{(formula 3)}$$

here, k is the storage position identifier of the storage position in the target warehouse;

$d_k$ is the storage position shelving path length of the storage position k of the target warehouse before normalization;

D is the storage position shelving path length set of the storage positions of the target warehouse before normalization;

$d_{min}$ is the minimum value in the storage position shelving path lengths of the storage positions of the target warehouse before normalization;

$d_{max}$ is the maximum value in the storage position shelving path lengths of the storage positions of the target warehouse before normalization;

$w_k$ is the normalized storage position shelving path length of the storage position k of the target warehouse;

W is the calculated normalized storage position shelving path length set of the storage positions of the target warehouse.

From the above description of the product shelving cost table and the storage position shelving path length table, it can be known that the product shelving cost table records the shelving cost of each of the products that can be stored in the target warehouse, and the storage position shelving path length table records the minimum value in the shortest path lengths from each storage position in the target warehouse to the warehouse doors in the target warehouse. In order to reduce the outbound cost, in practice, products with lower shelving costs may be shelved to a storage position closer to the warehouse door, while products with higher shelving costs may be shelved to a storage position farther away from the warehouse door. The central storage position of the shelving task is used to represent that shelving the to-be-shelved number of the to-be-shelved product to the central storage position may reduce the outbound cost as much as possible. Therefore, the storage position shelving path length corresponding to the storage position where a low shelving cost product is located should be smaller than the storage position shelving path length corresponding to the central storage position of the shelving task as much as possible, and the storage position shelving path length corresponding to the storage position where a high shelving cost product is located should be larger than the storage position shelving path length corresponding to the central storage position of the shelving task as much as possible. Here, the low shelving cost products are products indicated by product identifiers having product shelving costs less than the shelving cost of the shelving task in the product shelving cost table, and the high shelving cost products are products indicated by product identifiers having product shelving costs higher than the shelving cost of the shelving task in the product shelving cost table. According to the above principles, after acquiring the predetermined product shelving cost table and the predetermined storage position shelving path length table, the electronic device may use various implementation methods, based on the shelving cost of the shelving task calculated in step 202, the acquired product shelving cost table and the storage position shelving path length table, to determine the central storage position of the shelving task.

In some alternative implementations of the present embodiment, the storage position shelving path length table is sorted in an ascending order of storage position shelving path lengths, then step 204 may be performed as follows:

First, a sum of numbers of expected occupancy storage positions of respective low shelving cost products may be determined as a first sum of storage position numbers, where the low shelving cost products are products indicated by product identifiers having shelving costs less than the shelving cost of the shelving task in the product shelving cost table. Here, the number of expected occupancy storage positions of the product is the product of the expected inventory of the product in the target warehouse and the number of products accommodated in a unit of storage position in the target warehouse of the product. For example, the expected inventory in the target warehouse may be set for each product, so that the expected inventory of the product in the target warehouse may be directly acquired. Alternatively, a preset maximum inventory and a preset minimum inventory are set for each product in the target warehouse. In this way, the average value of the preset maximum inventory and preset minimum inventory for the product in the target warehouse may also be used as the expected inventory of the product in the target warehouse.

Then, the number obtained by rounding down the product of an expected occupancy storage position number of the to-be-shelved product and a preset ratio may be determined as a first number, where the preset ratio is a value greater than or equal to 0 and smaller than or equal to 1. For example, the preset ratio may be 0.5.

Then, a sum of the sum of the first storage position numbers and the first number may be determined as a central storage position location corresponding to the shelving task.

Finally, a storage position indicated by a storage position identifier arranged in a location of the central storage position in the storage position shelving path length table may be determined as the central storage position of the shelving task.

For example, the central storage position of the shelving task may be determined according to the following formula:

$$j = \operatorname{ceil}\left( \sum_{i=1}^{p} \operatorname{ceil}\left( \frac{s_{p_i}^{max} + s_{p_i}^{min}}{2 t_{p_i}} \right) + \frac{1}{2}\left( \operatorname{ceil}\left( \frac{s_{on}^{max} + s_{on}^{min}}{2 t_{on}} \right) \right) \right)$$

here, p is the number of low shelving cost products in the products that can be stored in the target warehouse;

i is a positive integer between 1 and p;

$p_i$ is the product identifier of the $i^{th}$ low shelving cost product;

$s_{p_i}^{max}$ is the preset maximum inventory of the product $p_i$;

$s_{p_i}^{min}$ is the preset minimum inventory of the product $p_i$;

$t_{p_i}$ is the number of products accommodated in a unit of storage position in the target warehouse of the product $p_i$;

on is the product identifier of the to-be-shelved product;

$s_{on}^{max}$ is the preset maximum inventory of the to-be-shelved product;

$s_{on}^{min}$ is the preset minimum inventory of the to-be-shelved product;

$t_{on}$ is the number of products accommodated in a unit of storage position in the target warehouse of the to-be-shelved product;

ceil( ) is the round down function;

$$\sum_{i=1}^{p} \operatorname{ceil}\left( \frac{s_{p_i}^{max} + s_{p_i}^{min}}{2 t_{p_i}} \right)$$

is the calculated sum of the expected occupancy storage position numbers of the low shelving cost products;

$$\frac{1}{2} \operatorname{ceil}\left( \frac{s_{on}^{max} + s_{on}^{min}}{2 t_{on}} \right)$$

is dividing the calculated number of the expected occupancy storage positions for the to-be-shelved number of the to-be-shelved product by 2, where dividing by 2 means taking half, that is, taking the middle and the center; and j is ranking of the storage position shelving path length of the storage position identifier of the calculated central storage position according to an ascending order of the storage position shelving path lengths.

Step 205, generating and outputting a recommended storage position information set corresponding to the shelving task, based on storage position information of the central storage position and storage position information of an available storage position in the target warehouse.

In the present embodiment, the central storage position of the shelving task is determined in step 204, that is, shelving the to-be-shelved number of the to-be-shelved product to a position around the center storage position may save the outbound cost. Therefore, for available storage positions of the target warehouse, various implementation methods may be used to select storage positions having small shortest path lengths to the central storage position as recommended storage positions, and storage position information of the selected recommended storage positions is used to generate the recommended storage position information set. Finally, the generated recommended storage position information may be output.

In some alternative implementations of the present embodiment, the generated recommended storage position information may be presented in the electronic device (for example, in the display screen of the electronic device).

In some alternative implementations of the present embodiment, the electronic device may alternatively send the generated recommended storage position information to other electronic devices connected to the electronic device on the network, so that other electronic devices may receive and present the generated recommended storage position information.

In some alternative implementations of the present embodiment, step 205 may be performed as follows:

First, a number obtained by rounding up the ratio of the to-be-shelved number to the number of the to-be-shelved product accommodated in a unit of storage position in the target warehouse may be determined as the sub-task number.

Second, the shelving task may be split into the sub-task number of sub-tasks.

Third, an empty recommended storage position information set may be established.

Fourth, for each sub-task of the sub-task number of sub-tasks, the following recommended storage position determination operations may be performed: searching for an available storage position having the shortest path to the central storage position in storage positions of the target warehouse; adding storage position information of the found available storage position to the recommended storage position information set; and marking the found available storage position as a non-available storage position.

Fifth, the recommended storage position information set is outputted.

Figure 3:
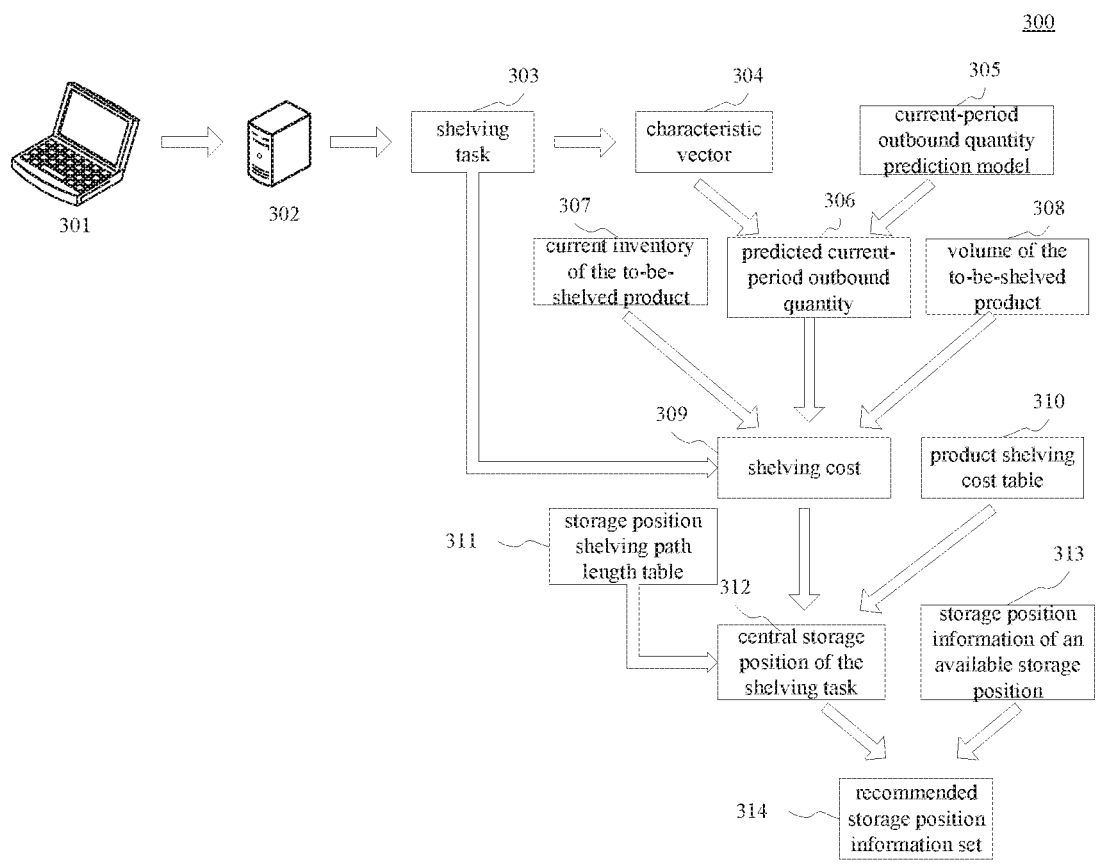
FIG. 3 is a schematic diagram of an application scenario of the method for outputting storage position information according to the present disclosure.

With further reference to FIG. 3, FIG. 3 is a schematic diagram of an application scenario of the method for outputting storage position information according to the present embodiment. In the application scenario of FIG. 3, first, a server 302 receives a shelving task 303 from a terminal device 301; then, the server 302 generates a characteristic vector 304 of a preset dimension based on attribute information of the to-be-shelved product in each attribute of a preset attribute set in the shelving task 303, and import the characteristic vector 304 into a pre-trained current-period outbound quantity prediction model 305 to obtain a predicted current-period outbound quantity 306 of the to-be-shelved product; after that, the server 302 determines a shelving cost 309 of the shelving task based on a current inventory 307 of the to-be-shelved product, the to-be-shelved number in the shelving task 303, the volume of the to-be-shelved product 308, and the predicted current-period outbound quantity 306 of the to-be-shelved product; determines a central storage position 312 of the shelving task, based on the shelving cost 309 of the shelving task, a predetermined product shelving cost table 310 and a predetermined storage position shelving path length table 311; and generates and outputs a recommended storage position information set 314 corresponding to the shelving task, based on storage position information of the central storage position 312 and storage position information 313 of an available storage position in the target warehouse.

According to the method provided by the above embodiment of the present disclosure, by predicting the predicted current-period outbound quantity of the to-be-shelved product, then determining the shelving cost of the shelving task based on the current inventory of the to-be-shelved product, the to-be-shelved number, the volume of the to-be-shelved product and the predicted current-period outbound quantity of the to-be-shelved product, then determining the central storage position of the shelving task, based on the shelving cost of the shelving task, the predetermined product shelving cost table and the predetermined storage position shelving path length table, and finally generating and outputting the recommended storage position information set corresponding to the shelving task, based on the storage position information of the central storage position and the storage position information of the available storage position in the target warehouse, effective storage position information output is realized.

Figure 4:
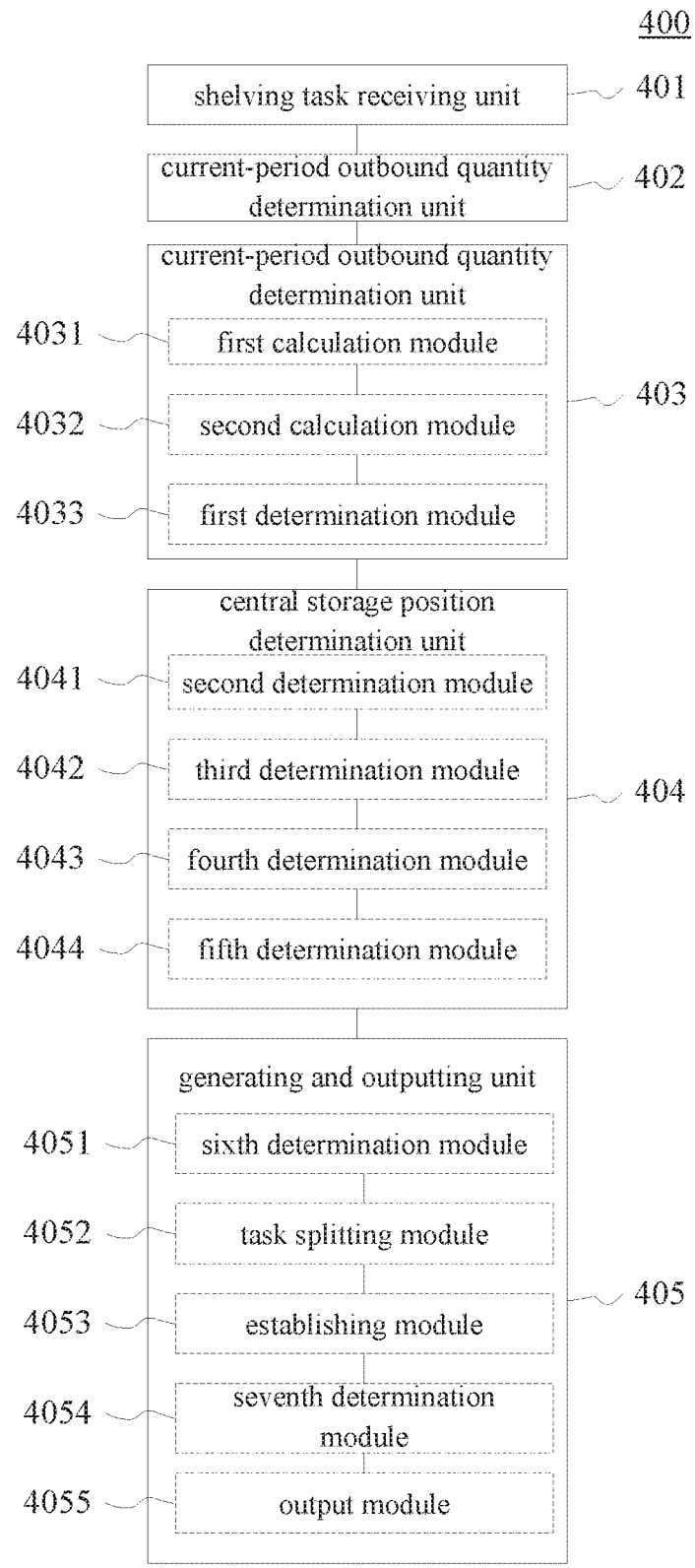
FIG. 4 is a schematic structural diagram of an embodiment of an apparatus for outputting storage position information according to the present disclosure.

With further reference to FIG. 4, as an implementation of the method shown in the above figures, the present disclosure provides an embodiment of an apparatus for outputting storage position information, and the apparatus embodiment corresponds to the method embodiment as shown in FIG. 2. The apparatus may be specifically applied to various electronic devices.

As shown in FIG. 4, an apparatus 400 for outputting storage position information of the present embodiment includes: a shelving task receiving unit 401, a current-period outbound quantity determination unit 402, a shelving cost determination unit 403, a central storage position determination unit 404 and a generating and outputting unit 405. Here, the shelving task receiving unit 401 is configured to receive a shelving task for shelving a to-be-shelved number of a to-be-shelved product to a target warehouse. The current-period outbound quantity determination unit 402 is configured to generate a characteristic vector of a preset dimension based on attribute information the to-be-shelved product in each attribute in a preset attribute set, and import the generated characteristic vector into a pre-trained current-period outbound quantity prediction model to obtain a predicted current-period outbound quantity of the to-be-shelved product, where the current-period outbound quantity prediction model is configured to represent a corresponding relationship between the characteristic vector of the preset dimension and the current-period outbound quantity. The shelving cost determination unit 403 is configured to determine a shelving cost of the shelving task based on a current inventory of the to-be-shelved product in the target warehouse, the to-be-shelved number, a volume of the to-be-shelved product, and the predicted current-period outbound quantity of the to-be-shelved product, where the shelving cost of the shelving task is negatively related to the predicted current-period outbound quantity of the to-be-shelved product and is positively related to the current inventory, the to-be-shelved number, and the volume of the to-be-shelved product. The central storage position determination unit 404 is configured to determine a central storage position of the shelving task, based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, where the storage position shelving path length is used to represent a minimum value in shortest paths between warehouse doors of the warehouse and a storage position indicated by a storage position identifier. The generating and outputting unit 405 is configured to generate and output a recommended storage position information set corresponding to the shelving task, based on storage position information of the central storage position and storage position information of an available storage position in the target warehouse.

In the present embodiment, the specific processing and the technical effects thereof of the shelving task receiving unit 401, the current-period outbound quantity determination unit 402, the shelving cost determination unit 403, the central storage position determination unit 404 and the generating and outputting unit 405 of the apparatus 400 for outputting storage position information may be referred to the relevant descriptions of step 201, step 202, step 203, step 204 and step 205 in the corresponding embodiment of FIG. 2, respectively, and detailed description thereof will be omitted.

In some alternative implementations of the present embodiment, the preset attribute set may include at least one of the following: a category, a brand, a current month, an outbound quantity in the last week, an outbound quantity in last two weeks, a preset maximum inventory, an inventory at a prest time of the last preset and a current inventory.

In some alternative implementations of the present embodiment, the current-period outbound quantity prediction model may be obtained through the following training steps: acquiring an initial current-period outbound quantity prediction model and a predetermined sample data set, where each piece of sample data in the sample data set includes an attribute information set of a product under attributes in the preset attribute set and a historical current-period outbound quantity corresponding to the product; generating, for each piece of sample data in the sample data set, a characteristic vector of the preset dimension corresponding to the attribute information set in the sample data; training, using a machine learning method, the initial current-period outbound quantity prediction model using the characteristic vector of the preset dimension corresponding to the attribute information set in each piece of sample data in the sample data set as input data and using the historical current-period outbound quantity in the sample data as corresponding output data; and determining the trained initial current-period outbound quantity prediction model as the pre-trained current-period outbound quantity prediction model.

In some alternative implementations of the present embodiment, the shelving cost determination unit 403 may include: a first calculation module 4031, configured to calculate a sum of the current inventory of the to-be-shelved product in the target warehouse and the to-be-shelved number; a second calculation module 4032, configured to calculate a product of the calculated sum and the volume of the to-be-shelved product; and a first determination module 4033, configured to determine a ratio of the calculated product to the predicted current-period outbound quantity of the to-be-shelved product as the shelving cost of the shelving task.

In some alternative implementations of the present embodiment, the storage position shelving path length table is sorted in an ascending order of storage position shelving path lengths; and the central storage position determination unit 404 may include: a second determination module 4041, configured to determine a sum of expected occupancy storage position numbers of low shelving cost products as a sum of first storage position numbers, where the low shelving cost products are products indicated by product identifiers in the product shelving cost table having product shelving costs less than the shelving cost of the shelving task; a third determination module 4042, configured to determine a number obtained by rounding down a product of an expected occupancy storage position number of the to-be-shelved product and a preset ratio as a first number, where the preset ratio is a value greater than or equal to 0 and smaller than or equal to 1; a fourth determination module 4043, configured to determine a sum of the sum of the first storage position numbers and the first number as a central storage position location corresponding to the shelving task; and a fifth determination module 4044, configured to determine a storage position indicated by a storage position identifier arranged in a location of the central storage position in the storage position shelving path length table as the central storage position of the shelving task.

In some alternative implementations of the present embodiment, the predetermined product shelving cost table may be obtained through the following steps: for each product identifier in a product identifier set corresponding to the target warehouse, performing the following shelving cost determination operations: generating a characteristic vector of the preset dimension based on attribute information of a product indicated by the product identifier in each attribute in the preset attribute set, and importing the generated characteristic vector into the current-period outbound quantity prediction model to obtain a predicted current-period outbound quantity of the product indicated by the product identifier; determining a shelving cost of the product indicated by the product identifier, based on a current inventory of the product indicated by the product identifier in the target warehouse, a volume of the product, and the predicted current-period outbound quantity of the product indicated by the product identifier, where the shelving cost of the product indicated by the product identifier is negatively related to the predicted current-period outbound quantity of the product indicated by the product identifier and is positively related to both the current inventory of the product indicated by the product identifier in the target warehouse, and the volume of the product; and generating the product shelving cost table based on each product identifier in the product identifier set corresponding to the target warehouse and the shelving cost of the product indicated by the product identifier.

In some alternative implementations of the present embodiment, the predetermined storage position shelving path length table may be obtained through the following steps: acquiring a directed graph corresponding to the target warehouse, where vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge and being adjacent to the storage position or the warehouse door corresponding to the starting point; for each storage position in the target warehouse, performing the following storage position shelving path length determination operations: for each warehouse door of the warehouse doors of the target warehouse, determining a shortest path length from the warehouse door to the storage position according to the directed graph; and determining a minimum value in shortest path lengths from the warehouse doors to the storage position of the target warehouse as a storage position shelving path length of the storage position; and generating the storage position shelving path length table, based on a storage position identifier of each storage position in the target warehouse and a storage position shelving path length of the storage position.

In some alternative implementations of the present embodiment, the generating and outputting unit 405 may include: a sixth determination module 4051, configured to determine a number obtained by rounding up a ratio of the to-be-shelved number to the number of products accommodated in a unit of storage position of the to-be-shelved product in the target warehouse as a sub-task number; a task splitting module 4052, configured to split the shelving task into the sub-task number of sub-tasks; an establishing module 4053, configured to establish an empty recommended storage position information set; a seventh determination module 4054, configured to, for each sub-task of the sub-task number of sub-tasks, perform the following recommended storage position determination operations: searching for an available storage position having a shortest path to the central storage position in storage positions of the target warehouse; adding storage position information of the found available storage position to the recommended storage position information set; and marking the found available storage position as a non-available storage position; and an output module 4055, configured to output the recommended storage position information set.

Figure 5:
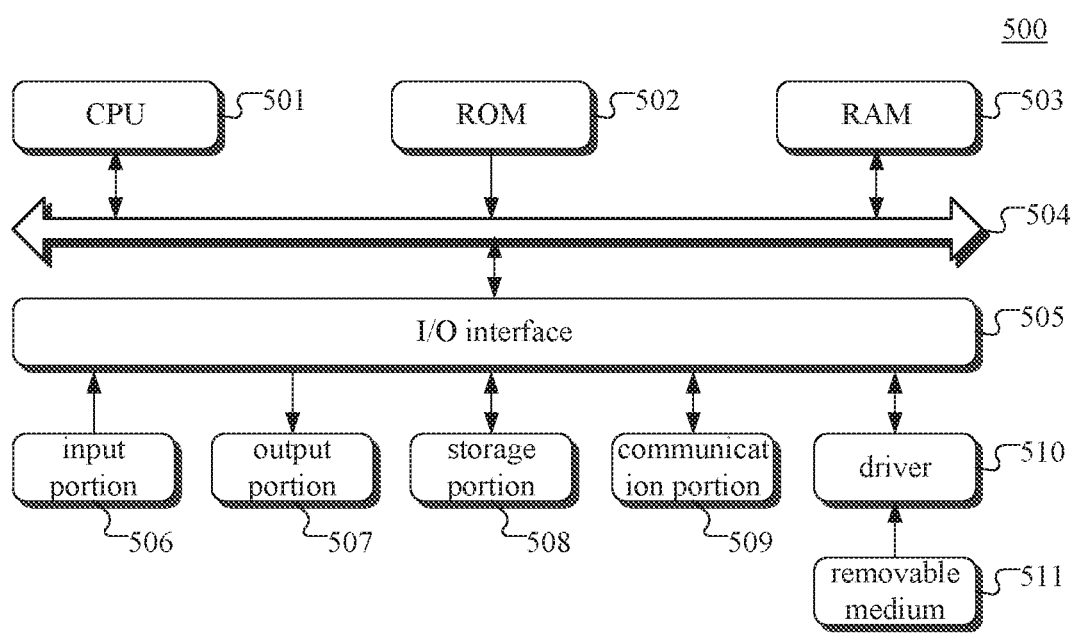
FIG. 5 is a schematic structural diagram of a computer system adapted to implement a server according to an embodiment of the present disclosure.

With further reference to FIG. 5, a schematic structural diagram of a computer system 500 adapted to implement a server of the embodiments of the present disclosure is illustrated. The server shown in FIG. 5 is merely an example and should not impose any limitation on the function and scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the computer system 500. The CPU 501, the ROM 502 and the RAM 503 are connected to each other through a bus 504. An input/output (I/O) interface 505 is also connected to the bus 504.

The following components are connected to the I/O interface 505: an input portion 506 including such as a keyboard, and a mouse; an output portion 507 including such as a cathode ray tube (CRT), liquid crystal display (LCD), and a speaker; the storage portion 508 including such as a hard disk; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 509, and/or may be installed from the removable medium 511. The computer program, when executed by the central processing unit (CPU) 501, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a shelving task receiving unit, a current-period outbound quantity determination unit, a shelving cost determination unit, a central storage position determination unit and a generating and outputting unit. Here, the names of these units do not in some cases constitute limitations to such units themselves. For example, the shelving task receiving unit may also be described as "a unit configured to receive a shelving task".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive a shelving task for shelving a to-be-shelved number of a to-be-shelved product to a target warehouse; generate a characteristic vector of a preset dimension based on attribute information of of the to-be-shelved product in each attribute of a preset attribute set, and import the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity; determining a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product; determine a central storage position of the shelving task, based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being used to represent a minimum value in shortest paths between warehouse doors of the warehouse and a storage position indicated by a storage position identifier; generate and output a recommended storage position information set corresponding to the shelving task based on storage position information of the central storage position and storage position information of an available storage position in the target warehouse.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting storage position information, the method comprising:
   receiving a shelving task for shelving a to-be-shelved number of a to-be-shelved product to a target warehouse;
   generating a characteristic vector of a preset dimension based on attribute information of the to-be-shelved product in each attribute of a preset attribute set, and importing the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity;
   determining a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product;
   determining a central storage position of the shelving task based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being used to represent a minimum value in shortest paths between warehouse doors of the warehouse and a storage position indicated by the storage position identifier;
   generating and outputting a recommended storage position information set corresponding to the shelving task, based on storage position information of the central storage position and storage position information of an available storage position in the target warehouse; and
   instructing a shelving apparatus to store an article in the target warehouse based on the recommended storage position information set corresponding to the shelving task, wherein the method is performed by a server comprising a processor and a memory, and the shelving apparatus is configured to carry the article and move.

2. The method according to claim 1, wherein the preset attribute set comprises at least one of: a category, a brand, a current month, an outbound quantity in a last week, an outbound quantity in last two weeks, a preset maximum inventory, an inventory at a preset time of a last period, or a current inventory.

3. The method according to claim 2, wherein the current-period outbound quantity prediction model is obtained through following training steps:
   acquiring an initial current-period outbound quantity prediction model and a predetermined sample data set, wherein each piece of sample data in the sample data set comprises an attribute information set of a product under attributes in the preset attribute set and a historical current-period outbound quantity corresponding to the product;
   generating, for each piece of sample data in the sample data set, a characteristic vector of the preset dimension corresponding to the attribute information set in the sample data;
   training, using a machine learning method, the initial current-period outbound quantity prediction model using the characteristic vector of the preset dimension corresponding to the attribute information set in each piece of sample data in the sample data set as input data and using the historical current-period outbound quantity in the sample data as corresponding output data; and
   determining the trained initial current-period outbound quantity prediction model as the pre-trained current-period outbound quantity prediction model.

4. The method according to claim 3, wherein the determining a shelving cost of the shelving task based on a current inventory of the to-be-shelved product in the target warehouse, the to-be-shelved number, a volume of the to-be-shelved product, and the predicted current-period outbound quantity of the to-be-shelved product, comprises:
   calculating a sum of the current inventory of the to-be-shelved product in the target warehouse and the to-be-shelved number;

calculating a product of the calculated sum and the volume of the to-be-shelved product; and determining a ratio of the calculated product to the predicted current-period outbound quantity of the to-be-shelved product as the shelving cost of the shelving task.

5. The method according to claim 4, wherein the storage position shelving path length table is sorted in an ascending order of storage position shelving path lengths; and the determining a central storage position of the shelving task based on the shelving cost of the shelving task, a predetermined product shelving cost table and a predetermined storage position shelving path length table, comprises:

determining a sum of expected occupancy storage position numbers of low shelving cost products as a sum of first storage position numbers, wherein the low shelving cost products are products indicated by product identifiers having product shelving costs less than the shelving cost of the shelving task in the product shelving cost table;

determining a number obtained by rounding down a product of an expected occupancy storage position number of the to-be-shelved product and a preset ratio as a first number, wherein the preset ratio is a value greater than or equal to 0 and smaller than or equal to 1;

determining a sum of the sum of the first storage position numbers and the first number as a central storage position location corresponding to the shelving task; and determining a storage position indicated by a storage position identifier arranged in a location of the central storage position of the storage position shelving path length table as the central storage position of the shelving task.

6. The method according to claim 5, wherein the predetermined product shelving cost table is obtained through following steps:

for each product identifier in a product identifier set corresponding to the target warehouse, performing following shelving cost determination operations: generating a characteristic vector of a preset dimension based on attribute information of a product indicated by the product identifier in each attribute of the preset attribute set, and importing the generated characteristic vector into the current-period outbound quantity prediction model to obtain a predicted current-period outbound quantity of the product indicated by the product identifier; determining a shelving cost of the product indicated by the product identifier based on a current inventory of the product indicated by the product identifier in the target warehouse, a volume of the product, and the predicted current-period outbound quantity of the product indicated by the product identifier, wherein the shelving cost of the product indicated by the product identifier is negatively related to the predicted current-period outbound quantity of the product indicated by the product identifier and is positively related to both the current inventory of the product indicated by the product identifier in the target warehouse, and the volume of the product; and generating the product shelving cost table based on each product identifier in the product identifier set corresponding to the target warehouse and the shelving cost of the product indicated by the product identifier.

7. The method according to claim 6, wherein the predetermined storage position shelving path length table is obtained through following steps:

acquiring a directed graph corresponding to the target warehouse, wherein vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge, the storage position or the warehouse door corresponding to the starting point of the directed edge being adjacent to the storage position or the warehouse door corresponding to the starting point;

for each storage position in the target warehouse, performing following storage position shelving path length determination operations: for each warehouse door of the warehouse doors of the target warehouse, determining a shortest path length from the warehouse door to the storage position according to the directed graph; and determining a minimum value in shortest path lengths from the warehouse doors to the storage position of the target warehouse as a storage position shelving path length of the storage position; and generating the storage position shelving path length table, based on a storage position identifier of each storage position in the target warehouse and a storage position shelving path length of the storage position.

8. The method according to claim 7, wherein the generating and outputting a recommended storage position information set corresponding to the shelving task based on the central storage position and an available storage position in the target warehouse, comprises:

determining a number obtained by rounding up a ratio of the to-be-shelved number to a number of products accommodated in a unit of storage position of the to-be-shelved product in the target warehouse as a sub-task number;

splitting the shelving task into the sub-task number of sub-tasks;

establishing an empty recommended storage position information set;

for each sub-task of the sub-task number of sub-tasks, performing following recommended storage position determination operations: searching for an available storage position having a shortest path to the central storage position in storage positions of the target warehouse; adding storage position information of the found available storage position to the recommended storage position information set; and marking the found available storage position as a non-available storage position; and outputting the recommended storage position information set.

9. An apparatus for outputting storage position information, the apparatus comprising:

a processor and a memory storing computer readable instructions, wherein the instructions, when executed by the processor, cause the processor to perform operations, the operations comprising:

receiving a shelving task for shelving a to-be-shelved number of a to-be-shelved product to a target warehouse;

generating a characteristic vector of a preset dimension based on attribute information of the to-be-shelved product in each attribute of a preset attribute set, and importing the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity;

determining a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product;

determining a central storage position of the shelving task, based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being configured to represent a minimum value in shortest paths between warehouse doors of the warehouse and a storage position indicated by, the storage position identifier;

generating and outputting a recommended storage position information set corresponding to the shelving task based on storage position information of the central storage position and storage position information of an available storage position in the target warehouse; and instructing a shelving apparatus to store an article in the target warehouse based on the recommended storage position information set corresponding to the shelving task, wherein the shelving apparatus is configured to carry the article and move.

10. The apparatus according to claim 9, wherein the preset attribute set comprises at least one of: a category, a brand, a current month, an outbound quantity in a last week, an outbound quantity in last two weeks, a preset maximum inventory, an inventory at a preset time of a last period, or a current inventory.

11. The apparatus according to claim 10, wherein the current-period outbound quantity prediction model is obtained through following training steps:

acquiring an initial current-period outbound quantity prediction model and a predetermined sample data set, wherein each piece of sample data in the sample data set comprises an attribute information set of a product under attributes in the preset attribute set and a historical current-period outbound quantity corresponding to the product;

generating, for each piece of sample data in the sample data set, a characteristic vector of the preset dimension corresponding to the attribute information set in the sample data;

training, using a machine learning method, the initial current-period outbound quantity prediction model using the characteristic vector of the preset dimension corresponding to the attribute information set in each piece of sample data in the sample data set as input data and using the historical current-period outbound quantity in the sample data as corresponding output data; and determining the trained initial current-period outbound quantity prediction model as the pre-trained current-period outbound quantity prediction model.

12. The apparatus according to claim 11, wherein the determining a shelving cost of the shelving task based on a current inventory of the to-be-shelved product in the target warehouse, the to-be-shelved number, a volume of the to-be-shelved product, and the predicted current-period outbound quantity of the to-be-shelved product, comprises:

calculating a sum of the current inventory of the to-be-shelved product in the target warehouse and the to-be-shelved number;

calculating a product of the calculated sum and the volume of the to-be-shelved product; and determining a ratio of the calculated product to the predicted current-period outbound quantity of the to-be-shelved product as the shelving cost of the shelving task.

13. The apparatus according to claim 12, wherein the storage position shelving path length table is sorted in an ascending order of storage position shelving path lengths; and the determining a central storage position of the shelving task based on the shelving cost of the shelving task, a predetermined product shelving cost table and a predetermined storage position shelving path length table, comprises:

determining a sum of expected occupancy storage position numbers of low shelving cost products as a sum of first storage position numbers, wherein the low shelving cost products are products indicated by product identifiers having product shelving costs less than the shelving cost of the shelving task in the product shelving cost table;

determining a number obtained by rounding down a product of an expected occupancy storage position number of the to-be-shelved product and a preset ratio as a first number, wherein the preset ratio is a value greater than or equal to 0 and smaller than or equal to 1;

determining a sum of the sum of the first storage position numbers and the first number as a central storage position location corresponding to the shelving task; and determining a storage position indicated by a storage position identifier arranged in a location of the central storage position of the storage position shelving path length table as the central storage position of the shelving task.

14. The apparatus according to claim 13, wherein the predetermined product shelving cost table is obtained through following steps:

for each product identifier in a product identifier set corresponding to the target warehouse, performing following shelving cost determination operations: generating a characteristic vector of a preset dimension based on attribute information of a product indicated by the product identifier in each attribute of the preset attribute set, and importing the generated characteristic vector into the current-period outbound quantity prediction model to obtain a predicted current-period outbound quantity of the product indicated by the product identifier; determining a shelving cost of the product indicated by the product identifier based on a current inventory of the product indicated by the product identifier in the target warehouse, a volume of the product, and the predicted current-period outbound quantity of the product indicated by the product identifier; wherein the shelving cost of the product indicated by the product identifier is negatively related to the predicted current-period outbound quantity of the product indicated by the product identifier and is positively related to both the current inventory of the product indicated by the product identifier in the target warehouse, and the volume of the product; and generating the product shelving cost table based on each product identifier in the product identifier set corresponding to the target warehouse and the shelving cost of the product indicated by the product identifier.

15. The apparatus according to claim 14, wherein the predetermined storage position shelving path length table is obtained through following steps:

acquiring a directed graph corresponding to the target warehouse, wherein vertices of the directed graph correspond to storage positions in the target warehouse and the warehouse doors in the target warehouse, respectively, a directed edge in the directed graph is used to represent that there is a directed aisle between a storage position or a warehouse door corresponding to the starting point of the directed edge, and a storage position or a warehouse door corresponding to the ending point of the directed edge, the storage position or the warehouse door corresponding to the starting point of the directed edge being adjacent to the storage position or the warehouse door corresponding to the starting point;

for each storage position in the target warehouse, performing following storage position shelving path length determination operations: for each warehouse door of the warehouse doors of the target warehouse, determining a shortest path length from the warehouse door to the storage position according to the directed graph; and determining a minimum value in shortest path lengths from the warehouse doors to the storage position of the target warehouse as a storage position shelving path length of the storage position; and generating the storage position shelving path length table, based on a storage position identifier of each storage position in the target warehouse and a storage position shelving path length of the storage position.

16. The apparatus according to claim 15, wherein the generating and outputting a recommended storage position information set corresponding to the shelving task based on the central storage position and an available storage position in the target warehouse, comprises:

determining a number obtained by rounding up a ratio of the to-be-shelved number to a number of products accommodated in a unit of storage position of the to-be-shelved product in the target warehouse as a sub-task number;

splitting the shelving task into the sub-task number of sub-tasks;

establishing an empty recommended storage position information set;

for each sub-task of the sub-task number of sub-tasks, performing following recommended storage position determination operations: searching for an available storage position having a shortest path to the central storage position in storage positions of the target warehouse; adding storage position information of the found available storage position to the recommended storage position information set; and marking the found available storage position as a non-available storage position; and outputting the recommended storage position information set.

17. A non-transitory computer readable storage medium, storing a computer program thereon, the program, when executed by a processor, cause the processor to perform operations, the operations comprising:

receiving a shelving task for shelving a to-be-shelved number of a to-be-shelved product to a target warehouse;

generating a characteristic vector of a preset dimension based on attribute information of the to-be-shelved product in each attribute of a preset attribute set, and importing the generated characteristic vector into a pre-trained current-period outbound quantity prediction model to obtain a predicted current-period outbound quantity of the to-be-shelved product, the current-period outbound quantity prediction model being configured to represent a corresponding relationship between the characteristic vector of the preset dimension and the current-period outbound quantity;

determining a shelving cost of the shelving task based on a current inventory of the to-be-shelved product in the target warehouse, the to-be-shelved number, a volume of the to-be-shelved product, and the predicted current-period outbound quantity of the to-be-shelved product, the shelving cost of the shelving task being negatively related to the predicted current-period outbound quantity of the to-be-shelved product and being positively related to the current inventory, the to-be-shelved number, and the volume of the to-be-shelved product;

determining a central storage position of the shelving task based on the shelving cost of the shelving task, a predetermined product shelving cost table and a predetermined storage position shelving path length table, the product shelving cost table being configured to represent a corresponding relationship between a product identifier and a product shelving cost, and the storage position shelving path length table being configured to represent a corresponding relationship between a storage position identifier and a storage position shelving path length, the storage position shelving path length being used to represent a minimum value in shortest paths between warehouse doors of the warehouse and a storage position indicated by the storage position identifier;

generating and outputting a recommended storage position information set corresponding to the shelving task, based on storage position information of the central storage position and storage position information of an available storage position in the target warehouse; and instructing a shelving apparatus to store an article in the target warehouse based on the recommended storage position information set corresponding to the shelving task, wherein the shelving apparatus is configured to carry the article and move.

* * * * *